United States Patent [19]

Rodgers et al.

[11] Patent Number: 4,698,740
[45] Date of Patent: Oct. 6, 1987

[54] CURRENT FED REGULATED VOLTAGE SUPPLY

[75] Inventors: Eugene L. Rodgers, Monroeville Boro; Eric J. Stacey, Penn Hills Township, Allegheny County, both of Pa.

[73] Assignee: Westinghouse Electric Corp., Pittsburgh, Pa.

[21] Appl. No.: 829,742

[22] Filed: Feb. 14, 1986

[51] Int. Cl.⁴ .................................................. H02M 7/155
[52] U.S. Cl. ....................................... 363/89; 323/223; 323/357; 323/358
[58] Field of Search ....................... 363/78, 84, 85, 86, 363/88, 89; 323/220, 223, 266, 357, 358

[56] References Cited

U.S. PATENT DOCUMENTS

| | | | |
|---|---|---|---|
| 3,369,167 | 2/1968 | Hanchett | 363/86 |
| 3,906,337 | 9/1975 | Depenbrook | 363/48 |
| 4,001,537 | 1/1977 | Burke et al. | 323/223 X |

Primary Examiner—Patrick R. Salce
Assistant Examiner—Emanuel Todd Voeltz
Attorney, Agent, or Firm—M. J. Moran

[57] ABSTRACT

The invention is a locally isolated regulated power supply providing a regulated dc power output from an ac current source having a large dynamic range. The power supply comprises an ac-to-dc converter for providing a rectified dc output from an ac current input. The converter includes a current transformer in combination with a rectifier. The current transformer has a saturable magnetic core for receiving primary and secondary windings. The current transfomer produces a reduced secondary output voltage that is a function of the ac system current characterized by the decreased coupling between the core and secondary winding as the core approaches saturation during substantial increases in the ac system current. One or more secondary windings and associated circuitry can be provided. In addition, an electronically controlled switch or shunt having as inputs a predetermined reference voltage and the dc output voltage of the rectifier or a signal equivalent thereto is connected across the converter. The switch provides for the continual shunting of the converter whenever the dc output voltage is equal to or greater than the predetermined reference voltage. A voltage support capacitor is connected across the output of the converter for maintaining the output voltage proportional to the selected reference voltage. An isolation diode is used to isolate the voltage support capacitor from the converter during those periods of time when the converter is being shunted by the electronically controlled switch. This prevents the discharge of the capacitor.

14 Claims, 9 Drawing Figures

CURRENT FED REGULATED VOLTAGE SUPPLY

FIELD OF THE INVENTION

The invention disclosed herein relates to regulated voltage supplies and, in particular, to locally isolated dc power supplies powered from ac current sources having a large dynamic range.

BACKGROUND OF THE INVENTION

In ac systems, locally isolated power supplies are used to provide dc voltage and current for various purposes. One application of this type of power supply is to provide gate firing energy to individual thyristors in a series connected thyristor array. This type of thyristor array is commonly used in static VAR generators to switch capacitors or inductors onto the ac system. For example, where the thyristors are used as a capacitor switch, the currents in the switch may occasionally reach 20 to 40 times the current rating of the thyristor. At times the current may be as low as one-tenth the rating of the thyristor. It is convenient to express these excursions in the current range on a per unit (P.U.) basis where one per unit is equal to the current rating of the thyristor or other device which is employed. For example, the dynamic range of the ac current source can extend from 0.1 P.U. to 40 P.U. To operate in the capacitor switch, the power supply for the gating circuit must therefore be designed to provide a required constant output when the input to the power supply can vary over a range of 400 to 1. Typically, the power supply is connected to the ac system using a current transformer. Because the load represented by the firing circuit of the thyristor switch is relatively constant while the current in the ac system is variable, the transformer is designed to operate at the minimum current level expected. A surplus capability then exists at any currents higher than the design level and this must be bypassed if the output voltage is to remain constant. For example, where a load such as the gate firing circuit is to be supplied with 24 volts at 250 mA and the thyristor has a rated average input current of 2000 amperes which is equal to 1 P.U., then the minimum design current, assuming a 0.1 to 40 P.U. dynamic range for the ac system, would be 200 amperes. For the current transformer a turns ratio between the secondary and primary windings of 800:1 is required. At the rated average input of 2000 amperes, this current transformer will be furnishing ten times the required current (i.e., 2.5 amperes). If a zener diode is used to regulate the output voltage of the power supply, it will dissipate 54 watts continuously. This figure is determined by multiplying the output voltage of the power supply by the difference between the actual current of 2.5 amperes being furnished and the desired 250 milliamp output. Under surge current conditions of 20 P.U. (40,000 amperes), the dissipation will transiently approach 1200 watts. To handle this sort of dissipation reliably, special zener diodes are required and careful attention must be given to thermal operating conditions. A power supply having reduced current and heat dissipation during surge current condition would therefore be advantageous. One object of the present invention is to provide a power supply operable from an ac current source having a large dynamic range in which the excess current or power dissipated therein is reduced.

SUMMARY OF THE INVENTION

The invention is a locally isolated, regulated dc power supply providing a regulated dc power output from an ac current source having a large dynamic range. The power supply comprises an ac-to-dc converter for providing a rectified dc output from an ac current input. The converter includes a current transformer in combination with a rectifier. The current transformer has a saturable magnetic core for receiving primary and secondary windings with the primary winding connected to the ac system current source. The secondary winding and magnetic core are inductively coupled to the primary winding. The current transformer produces a secondary current which is a nonlinear function of the input current. This function is characterized by decreased magnetic coupling between the core and secondary winding as the core approaches saturation during substantial increases in the ac system current. This characteristic results in near full coupling of the primary and secondary windings at normal primary current levels and substantially reduced coupling and reduced secondary current at very high levels of primary current. Connected across the output of the converter is an electronically controlled semiconductor switch for the continual short circuiting of the secondary current of the transformer whenever the dc output voltage exceeds a reference voltage by a predetermined amount. A dc capacitor is used as a means to support the dc output voltage while the converter is short circuited. A diode is used as a means for isolating this capacitor to prevent it from discharging through the electronic switch. The capacitor voltage decreases as it is discharged by the load current, when the dc voltage is reduced below the dc reference voltage by a predetermined amount the switch is turned off and the converter now furnishes the load current and if a surplus current exists charges the capacitor towards its upper limit.

Various embodiments of this scheme may be used. In one embodiment, a comparator having hysteresis is used to control the semiconductor switch. There, a signal representative of the output voltage of the converter and a predetermined reference voltage serve as inputs to the comparator. The semiconductor switch can be a MOSFET, a gate turn-off thyristor, or a bipolar transistor. In another embodiment, a breakover diode in combination with a voltage divider is used to trigger thyristors that act to shunt the converter. In addition, the thyristors can be used with the comparator/semiconductor switch combination. Shunting of the converter can occur at the secondary winding, the input to the rectifier or the output of the rectifier. Other embodiments include the use of a current transformer having multiple secondary windings to provide for multiple power supplies.

BRIEF DESCRIPTION OF THE DRAWINGS

For a better understanding of the invention, reference may be made to the embodiments exemplary of the invention shown in the accompanying drawings wherein.

DESCRIPTION OF THE PREFERRED EMBODIMENT

Figure 1:
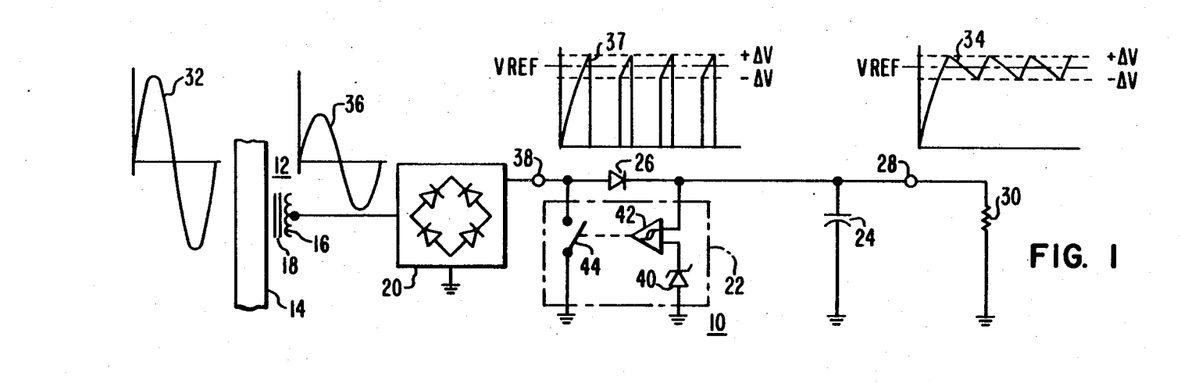
FIG. 1 is a single line diagram of the invention.

Shown in FIG. 1 is a single line diagram of the major components of the power supply 10 embodying the invention. The components include a current transformer 12 having a primary winding 14, secondary winding 16 and saturable magnetic core 18, a rectifier 20, an electronically controlled switching element 22, and a voltage support means, a capacitor 24, used in combination with an isolation device, a diode 26, for providing a continuous dc power output 28 to a load device 30. Also shown in FIG. 1 are representative illustrations of the voltage or current waveforms as the ac current input illustrated at 32 is converted to the required dc voltage output shown at 34. The secondary winding 16 of the current transformer 12 produces a reduced ac current output shown at 36. The amount of reduction is dependent on the turns ratio between the primary winding 14 and secondary winding 16 of the current transformer 12. Reduction ratios in the range of 500:1 to 1000:1 are quite common with the actual reduction ratio being determined by the operating conditions for the power supply 10. The rectifier 20, such as a diode bridge, is used to create a full-wave rectified dc signal shown at 37 at its output 38. The switching element 22 is comprised of a zener diode 40, a comparator 42 having hysteresis and a shunt switch 44. At the electronically controlled switch element 22, the dc voltage output signal 28 is compared to a reference voltage VREF that is established by the breakover voltage of the zener diode 40. These two signals serve as the inputs to the comparator 42 whose output actuates the shunt switch 44 connected in shunt with the output 38 of the rectifier 20. When the voltage of capacitor 24 exceeds the reference level VREF, the shunt switch 44 is actuated, shunting the rectifier 20. The capacitor 24 is used to support the dc output voltage about the reference level VREF during those periods of time when the switch 44 is actuated.

The peak-to-peak magnitude of the ripple on the dc output voltage 28 is set to a value of between minus and plus ΔV by the hysteresis of the comparator 42. When the shunt switch 44 is open, the capacitor 24 charges to the sum of the reference voltage plus Δv. When the switch is closed, the capacitor 24 discharges to the reference voltage VREF minus ΔV. The voltage waveforms produced at the converter output 38 and the dc output 28 are as shown at 37 and 34, respectively. The switching frequency is then determined by the magnitudes of the ac secondary current of the current transformer 12, the dc load current and the size of the capacitor 24. The average value of the pulsed current which flows into the capacitor 24 when the shunt switch 44 is open is equal to the dc current drawn by the load 30. The excess current from the current transformer secondary 16 is bypassed by the shunt switch 44 when it is closed. The only dissipation in this regulator is due to the switch and diode drops and to transformer losses. The maximum current in the shunt switch 42 and its losses are reduced at high currents due to the nonlinear coupling design of the current transformer 12.

Figure 2A:
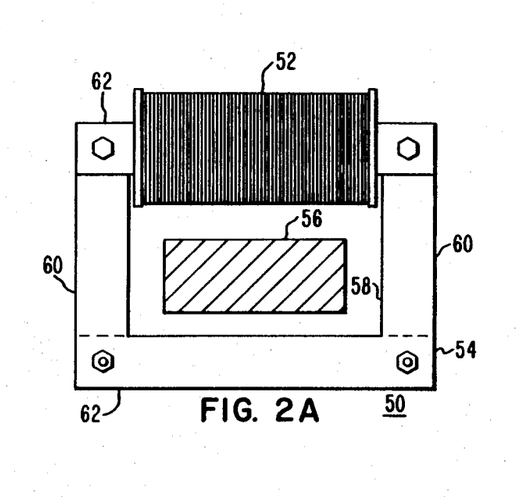
FIGS. 2A and 2B are plan and elevational views, respectively, of one embodiment for the current transformer used in various embodiments of the power supply and in FIG. 2C are illustrations of voltage-magnetizing current saturation curves.
Figure 2B:
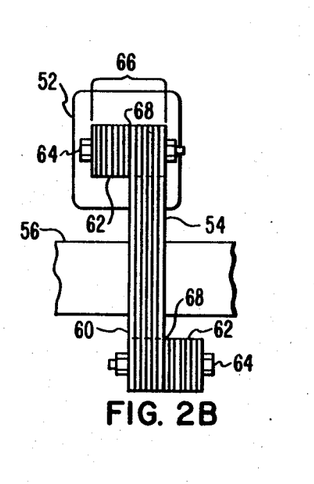

A substantial reduction in excess current can be achieved by employing a transformer design which results in good magnetic coupling at low current values and poor coupling at high current values. The current transformer that is used with the various embodiments of the invention illustrated is shown in FIGS. 2A and 2B. As shown there, the current transformer 50 has a lumped or concentrated secondary winding 52 wound about a portion of a laminated silicon steel core 54 that uses a stacked joint construction to obtain these desired characteristics. The terms "lumped secondary winding" and "concentrated secondary winding" mean that the winding is wound about only a short length of the total circumference or perimeter of the core 54. The core 54 substantially surrounds the primary winding 56 that is received in and passes through the opening 58 provided in the core 54 for this purpose. Here the primary winding 54 is a single turn winding formed by a bus bar that carries the ac system current. The core 54 is constructed of two pairs 60, 62 of matching legs, with each leg formed by a laminated stack of steel pieces. The leg pairs 60, 62 are joined together by conventional fasteners such as bolts 64 to form stacked joints 66. Taken in cross-section at the joints 66, the core 54 would appear to have either a C-shape or Z-shape depending on which surface of the leg pair 60 is used for the attachment of the leg pair 62. A Z-shaped core is illustrated. The somewhat imperfect core joints 66 effectively provide air gaps 68 in the magnetic flux path of the core 58. These air gaps 68 serve the important function of resetting the core flux to nearly zero at the end of a primary current pulse. The current transformer is thereby enabled to supply current if the next primary current pulse happens to be of the same polarity as the preceding pulse. Without resetting, the core 58 can saturate too soon to provide sufficient secondary current. In an alternative core construction, U-shaped lamination stacks can also be used in lieu of three of the legs. The open end of the U would be closed by a straight laminate stack fastened to form a stack joint as described.

Figure 2C:
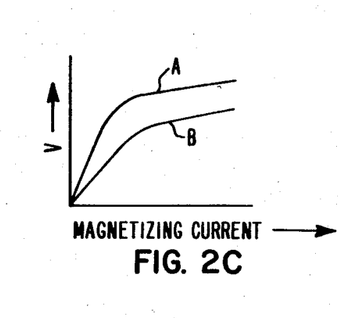

The current limiting effect of the transformer 50 is a result of the leakage flux and core saturation characteristics. The lamination material for the core 54 is selected to produce a "soft" voltage-magnetizing current saturation curve. By this it is meant that the characteristic voltage-magnetizing current curve typical of "hard" saturation and which has a fairly steep initial slope and a sharp knee is replaced by a curve having a less steep initial slope and a more rounded knee. The effect is, that for a given degree of core magnetization near the saturation point, a larger magnetizing current is present in a core having the "soft" curve than in a core having the "hard" curve. Examples of the "hard" and "soft" magnetizing curves are illustrated in FIG. 2C at curve A and curve B, respectively.

In contrast to usual current transformer construction, the current transformer is designed for relatively high leakage inductance. The use of a concentrated or lumped secondary winding on only one leg of the box-shaped core causes the leakage inductance to be relatively high with respect to the core magnetizing inductance. The leakage inductance can also be viewed as secondary winding inductance Ls. A simplified equivalent circuit for the transformer can be thought of as a magnetizing inductance Lm connected in parallel to the series combination of the secondary winding resistance Rs and the secondary winding inductance Ls. The primary current, ip, flowing in the equivalent circuit is comprised of the magnetizing current, im, flowing through the magnetizing inductance Lm and the secondary current, is, flowing through the resistance Rs and the secondary winding inductance Ls. If the secondary resistance Rs and the secondary inductance Ls are small relative to the magnetizing inductance Lm, then the magnetizing current, im, will be small relative to the primary current, ip. At high values of primary current, ip, the core will be magnetized to a relatively low level and the transformation ratio should remain constant because the core permeability remains constant. Tests have shown this to be the case with toroidal core transformer construction which has low secondary leakage inductance due to the uniformly distributed winding around the core circumference. These tests also indicated that the winding resistance has a relatively small current limiting effect in comparison to that due to the leakage inductance.

If the secondary inductance Ls is relatively large in comparison to the magnetizing inductance Lm then the degree of core magnetization is higher for any particular value of primary current than in a transformer having a very low secondary inductance such as a toroidal core transformer. The high peak primary currents that can occur cause sufficient core magnetization to drive the core to a region of decreased permeability. The decrease in core permeability causes a relative increase in the magnetizing current, im, with respect to the primary current, ip. As the primary current increases, a higher degree of core magnetization is required to produce the voltage across the secondary winding. At the higher magnetizing level, arranged by design to approach the knee of the magnetizing curve, proportionally more of the primary current is required to magnetize the core. The current transformation ratio is effectively increased at higher currents. This results in a peak secondary current limiting action. Tests have shown that a current transformer of the current limiting type disclosed can provide nearly 100% coupling at low current values, i.e. current values between 0 to about 10 per unit values, and only 40 to 60% coupling at surge current levels, typically considered to be about the 20 per unit value. Use of this transformer alone could therefore reduce the peak current and dissipation in the power supply to about one-half its original level. However, even at this reduced level the dissipation is still quite significant. We have found that this dissipation can be substantially reduced and potentially eliminated by incorporating the electronically controlled switching element to short circuit the secondary winding of the current transformer or the output of the rectifier. Thus, we have found that by using this current limiting current transformer in combination with an electronically controlled shunt switch, significant reduction in the power dissipation of the power supply during surge current conditions can be achieved in comparison to conventional power supply designs.

Figure 3:
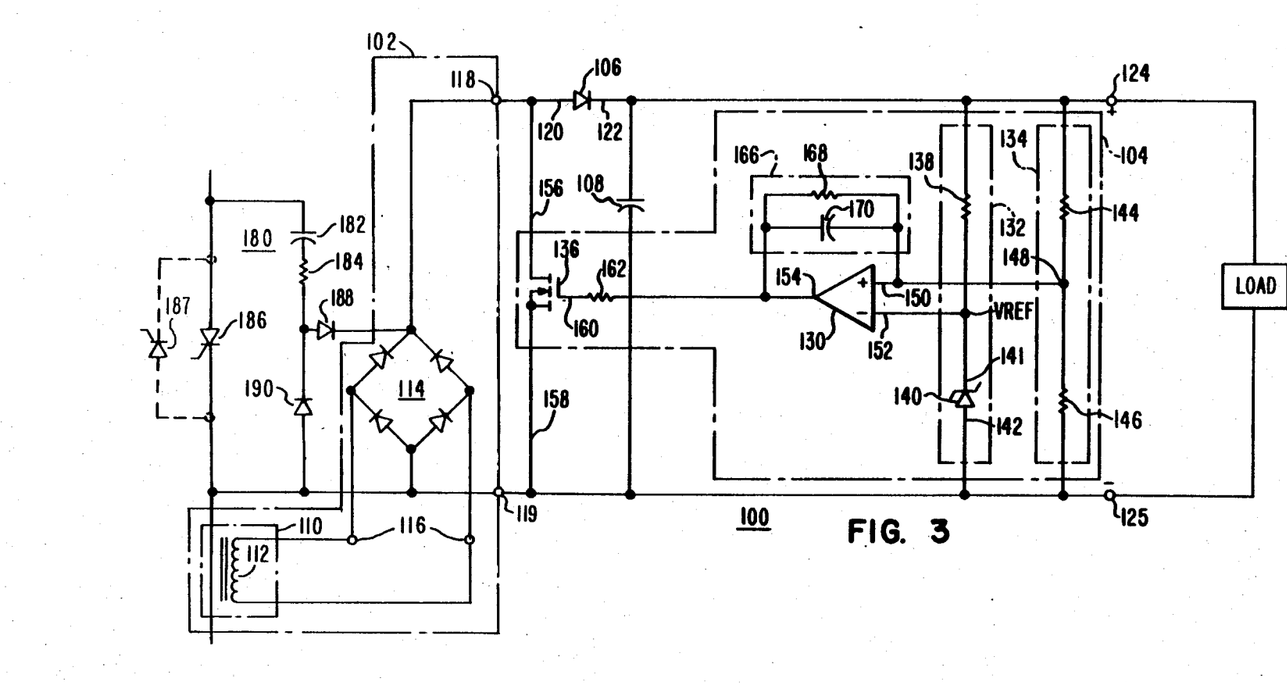
FIG. 3 is a schematic representation of the invention using a comparator/semiconductor switch shunting scheme.

In the various embodiments of the invention illustrated in FIGS. 3 through 7, the output of the power supply is assumed to be a positive dc voltage. The power supply can be configured to provide a negative dc voltage as well as both negative and positive dc voltages. In FIG. 3 the regulated power supply 100 is comprised of an ac-to-dc converter unit 102, an electronically controllable switch assembly 104, an isolation diode 106 and a voltage support capacitor 108. The ac-to-dc converter 102 is comprised of a current transformer 110 having the construction previously described with the secondary winding 112 of the transformer 110 being connected to a full-wave diode bridge rectifier 114 at the input terminals 116 thereof. At the output terminals 118, 119 of the rectifier designated plus and common, respectively, a full-wave rectified dc power signal is produced. The isolation diode 106 is connected in series with the voltage support capacitor 108 with the resulting combination connected across the plus and common terminals. The anode 120 of the isolation diode is connected to the plus terminal 118 with the cathode 122 thereof connected to the capacitor 108. The voltage appearing on the capacitor 108 is then provided to the output terminal 124 of the power supply 100 while the common 119 is connected to the power supply output terminal 125.

The electronically controlled switch assembly 104 regulates the output of the power supply 100. The switch assembly is comprised of a comparator 130 utilizing hysteresis, a reference voltage source 132, a voltage divider 134 and a MOSFET switch 136. The reference voltage source 132 is formed by a series combination of a resistor 138 and a zener diode 140 with the resistor connected to the cathode 141 of the zener diode 140. The anode 142 of the zener diode is connected to the common 119. The other end of the resistor is connected to the cathode 122 of the isolation diode 106. The voltage divider 134 is connected to the cathode 122 of the isolation diode 106 and to the common 119. The voltage divider 134 has at least two resistors 144, 146 connected in series and an output 148 between two of the resistors. The voltage divider 148 serves as a means for providing a level signal indicative of the magnitude of the rectified dc output voltage. The output 148 of the voltage divider 134 is connected to the non-inverting input 150 of the comparator 130. The inverting input 152 of the comparator 130 is connected to the cathode 141 of the zener diode 140. The output 154 of the comparator 130 is used to control the MOSFET switch 136 that has its drain 156 and source 158 connected to the plus 118 and common 119 output terminals of the rectifier 114, respectively. The output 154 of the comparator 130 is connected to the gate 160 of the MOSFET switch 136 through a damping resistor 162. A hysteresis circuit 166, including a resistor 168 in parallel with a capacitor 170, is connected across the non-inverting input 150 and output 154 of the comparator 130.

In operation the secondary winding 112 of the current transformer 110 produces a reduced ac current that is converted to a full-wave rectified dc current at the output of the rectifier 114. The rectified current from the converter 102 flows through the isolation diode 106 and charges the voltage support capacitor 108 causing the dc output voltage to increase. A fraction of the dc output established by the voltage divider 134, appears at the output 148 of the voltage divider 134 that is connected to the non-inverting input 150 of the comparator 130. This voltage is then compared to a reference voltage, VREF, established by the zener diode 140 at the inverting input 152 of the comparator 130. When the voltage at the non-inverting input 150 exceeds the reference voltage, VREF, the output of comparator 130 will become positive turning on the MOSFET switch 136, shunting the output of the rectifier 114. At this point the isolation diode 106 is reversed biased, and the voltage support capacitor 108 cannot discharge through the short circuit created by the MOSFET switch 136. The effect of the hysteresis circuit 166 is to shift the value of the voltage appearing at the non-inverting input 150 of the comparator 130 so as to provide a dead band about the switching point of the comparator 130 established by the reference voltage, VREF. Here the output of the power supply is regulated by the switch assembly 104 at a value substantially proportional tot he reference voltage VREF.

The circuit of FIG. 3 can be utilized in an ac thyristor valve to provide dc power for a control circuit that is used to trigger an individual thyristor in the valve. This is shown by the elements with the dotted lines. In this application a snubber circuit 180, usually comprising the series combination of a capacitor 182 and a resistor 184 is connected at one end to the anode of each thyristor 186 in the valve. The snubber circuit 180 is used to protect the thyristor during dv/dt transients and to aid in voltage sharing among the individual thyristors in the valve. The current transformer 110 would be placed about the ac conductor providing current to the antiparallel connected pair of thyristors 186 and 187. Thus, the current flowing through the thyristors 186 and 187 would also serve as the ac current source for the power supply 100. The cathode of thyristor 186 is connected to the anode of thyristor 187 and also to the common or negative side of the rectifier output 119. The snubber circuit 180 has one end connected to the anode of thyristor 186, and is connected at the other end to the anode of diode 188 and the cathode of diode 190. The cathode of diode 188 is connected to the plus terminal 118 and the anode of diode 190 is connected to the common terminal 119. By providing a pair of diodes connected between the snubber circuit 180 and the converter 102, the positive half cycles of snubber circuit current may be used as a supplementary current source when the thyristors are off, thus enabling dc power to be maintained whether the thyristors are on or off. With this arrangement the semiconductor switch 160 must be rated to carry the peak snubber discharge current that will occur when the complimentary thyristor in the antiparallel thyristor pair is fired at the highest voltage level that can occur in the system. A mirror-image power supply circuit substantially the same as the circuit 100 would be connected to the cathode of the thyristor 187 and to the end of the snubber circuit 180 connected to the anode of thyristor 186 via a diode pair connected substantially the same as diodes 188 and 190. This permits using the negative half cycles of snubber circuit current. Similar arrangements can be provided for the circuits depicted in FIGS. 4-7.

Figure 4:
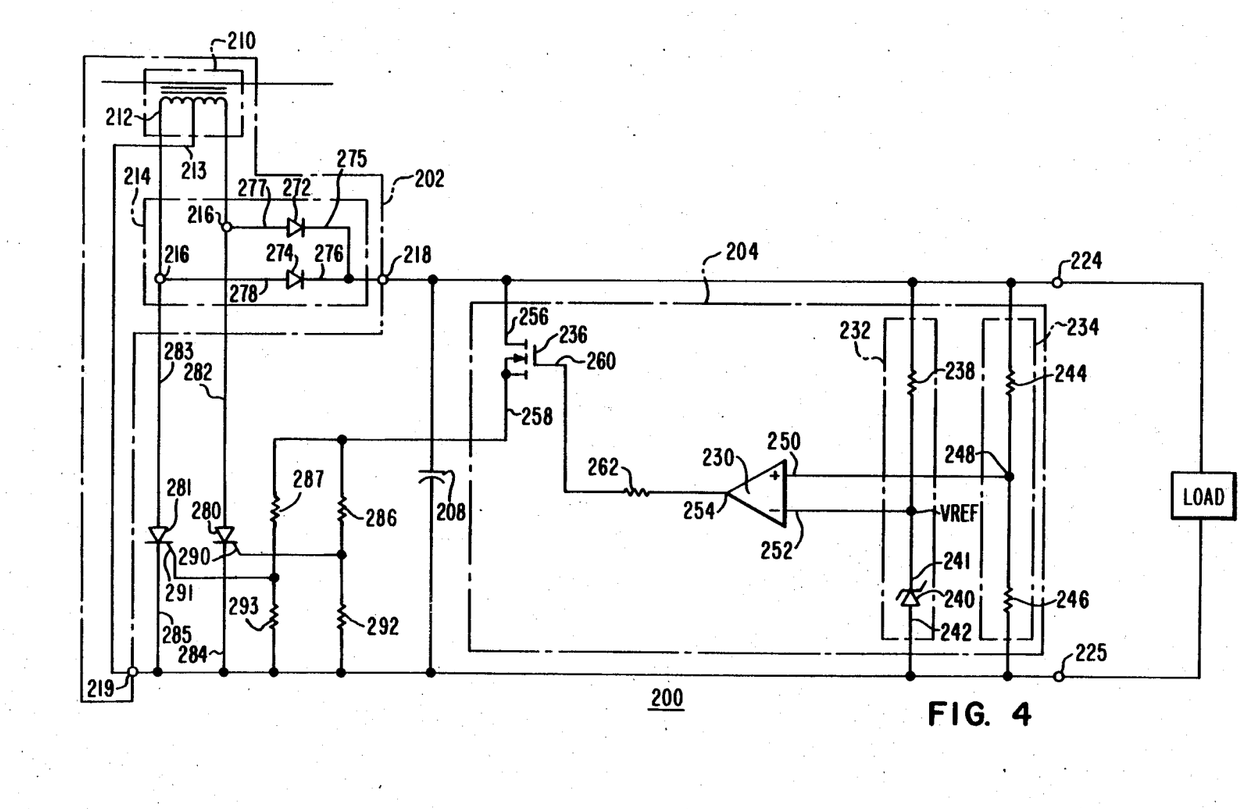
FIG. 4 is a schematic diagram of an alternate shunting scheme employing shunting thyristors and a center tapped transformer in combination with the semiconductor switch and comparator.

In FIG. 4 a power supply 200 uses a variation of the switching regulation scheme of FIG. 3 with a current transformer having a center tapped secondary winding. The regulated power supply 200 is comprised of an ac-to-dc converter unit 202, a voltage sensitive electronic thyristor firing assembly 204 including a pair of thyristor switches, and a voltage support capacitor 208. The ac-to-dc converter 202 is comprised of a current transformer 210 having the construction previously described except that the secondary winding 212 of the transformer has a center tap 213. The secondary winding 212 is connected to a two diode full wave rectifier 214 at the input terminals 216 thereof. At the output terminals 218, 219 of the rectifier, designated plus and common, respectively, a full-wave rectified dc current is produced. The common terminal 219 of the rectifier 214 is connected to the center tap 213 of the secondary winding 212. Again, the rectifier 214 is connected across the secondary winding 212 of the current transformer 210. Here the rectifier 214 is comprised of two diodes 272 and 274 having their cathodes 275 and 276, respectively, connected in common to the plus terminal 218. The anode 277 of diode 272 is connected to one of the input terminals 216 while the anode 278 of diode 274 is connected to the other input terminal 216. Connected between the input terminals 216, 216 and the common 219 are thyristors switches 280 and 281. The anode 282 of thyristor 280 is connected to anode 277 of diode 272 and the anode 283 of thyristor 281 is connected to the anode 278 of diode 274. The cathodes 284 and 285 of thyristor switches 280 and 281, respectively, are connected to the common 219. Connected between the common 219 and the plus terminal 218 is the voltage support capacitor 208.

The single semiconductor switch as used previously and described in FIG. 3, is replaced with two thyristors which are triggered by the comparator through a MOSFET current amplifier. Where possible, components having the same or similar functions will be similarly numbered but starting in the 200 series. For example, the comparator 130 of FIG. 3 would be numbered 230 in FIG. 4, similarly for the other common components. With this circuit no hysteresis is needed. Therefore, no positive feedback resistor is connected from the comparator output to its noninverting input terminal. Resistors 286 and 287 are used to interconnect the MOSFET switch 236 to the thyristors 280 and 281. Resistor 286 connects the source 258 of the MOSFET switch gate 290 of thyristor 280. Resistor 287 connects the source 258 to the gate 291 of thyristor 281. Resistors 286 and 287 serve as means for limiting the gate current provided for triggering the thyristors when the MOSFET switch 236 is actuated. The gate 290 is also connected to the common 219 through resistor 292. Similarly, the gate 291 is connected to the common 219 through resistor 293. Resistors 292 and 293 serve as means for bypassing leakage currents to prevent false triggering of the thyristors 280 and 281 when the MOSFET switch 236 is off.

In operation, when the voltage appearing at the non-inverting input 250 of the comparator 230 exceeds the reference voltage VREF established by the zener diode 240, the MOSFET switch 236 is triggered, sending a current pulse via the resistors 286 and 287 into the gates 290, 291 of the thyristors 280 and 281, respectively. These current pulses trigger the thyristors 280, 281, shunting the secondary winding 212 of the current transformer 210. The thyristors 280 and 281 will be switched on and will conduct during alternate half cycles after being triggered on when the voltage at the non-inverting input 250 of the comparator 230 exceeds the reference voltage, VREF. Each thyristor will remain on until the current passes through zero at the end of each half cycle. During the times when the thyristors conduct, the output current from the current transformer 210 is short circuited, and the dc load is supported by the capacitor 208. The diodes 272 and 274 are reversed biased, preventing the discharge of the voltage support capacitor 208 by the thyristors.

Figure 5:
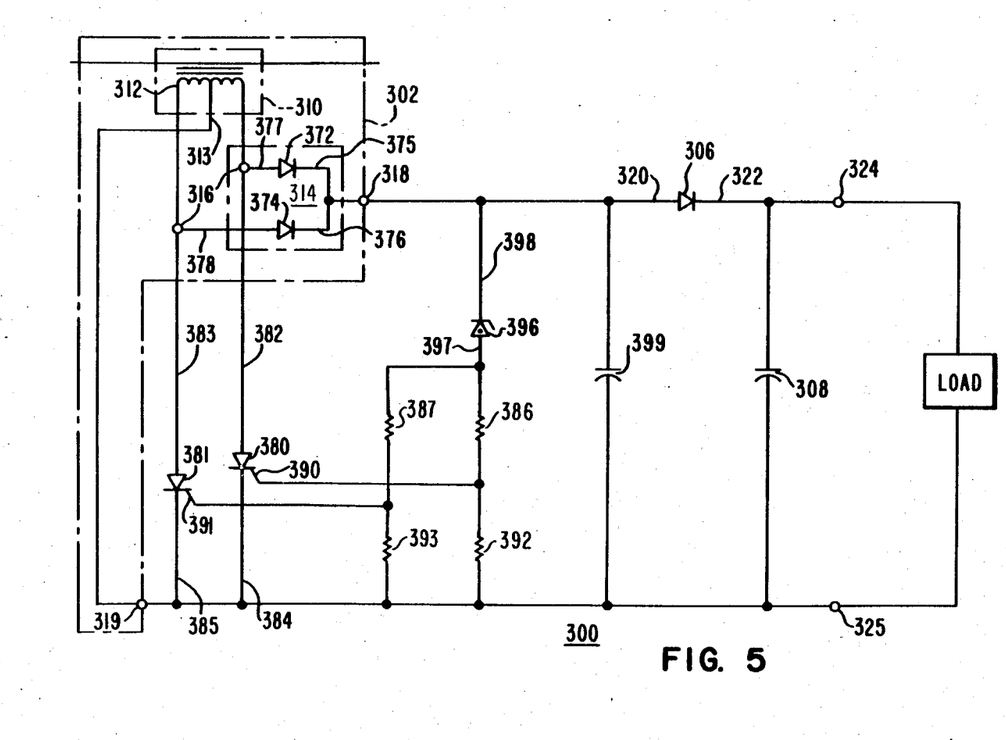
FIG. 5 is an schematic representation of an alternate shunting scheme using a breakover diode in combination with shunting thyristors and a center tapped transformer.

In FIG. 5 an alternate arrangement of the circuit of FIG. 4 using a breakover diode switching technique is shown. The power supply 300 is similar to that shown in FIG. 3. Components having the same or similar functions will be similarly numbered but starting in the 300 series. The power supply 300 is comprised of an ac-to-dc converter 302 including the current transformer 310, the rectifier 314 and the thyristors 380 and 381 and their associated current limiting resistors 386 and 387 and leakage current bypass resistors 392 and 393 are substantially the same in both design and function as their companions in FIG. 4. Here however the switch assembly 204 is replaced by a breakover diode 396. The anode 397 of the breakover diode 396 is connected to the resistors 286 and 287 while the cathode 398 thereof is connected to the plus terminal 318 of the rectifier 314. A capacitor 399 is also connected between the plus terminal 318 and common 319 of the power supply 300. An isolation diode 306, functioning substantially in the same manner as the isolation diode 106 of FIG. 3, and a voltage support capacitor 308 are also provided. The anode 320 of the isolation diode 306 is connected to the plus terminal 318 of the rectifier 314 with the cathode 322 thereof connected in series to the capacitor 308 which is then connected to the common 319.

In this circuit when the voltage appearing at the plus terminal 318 of the rectifier 314 exceeds the breakover voltage of the breakover diode 396, the breakover diode will conduct, sending a current pulse to the gates 390 and 391 of the thyristors 380 and 381, respectively, which will then be triggered, shunting the secondary winding 312 of the current transformer 310. Here the breakover voltage of the breakover diode is the reference voltage which sets the peak level of the dc output voltage which occurs at the instant the thyristors are triggered by the breakover diode. The capacitor 399 is discharged when the breakover diode 396 conducts, providing a source of gate current for the thyristors 380 and 381. When the breakover diode 396 is in conduction, the isolation diode 306 is reversed biased, preventing the voltage appearing across the voltage support capacitor 308 from being discharged through the circuit path of the breakover diode 396 and the resistors 386 and 392 or resistors 387 and 393.

Figure 6:
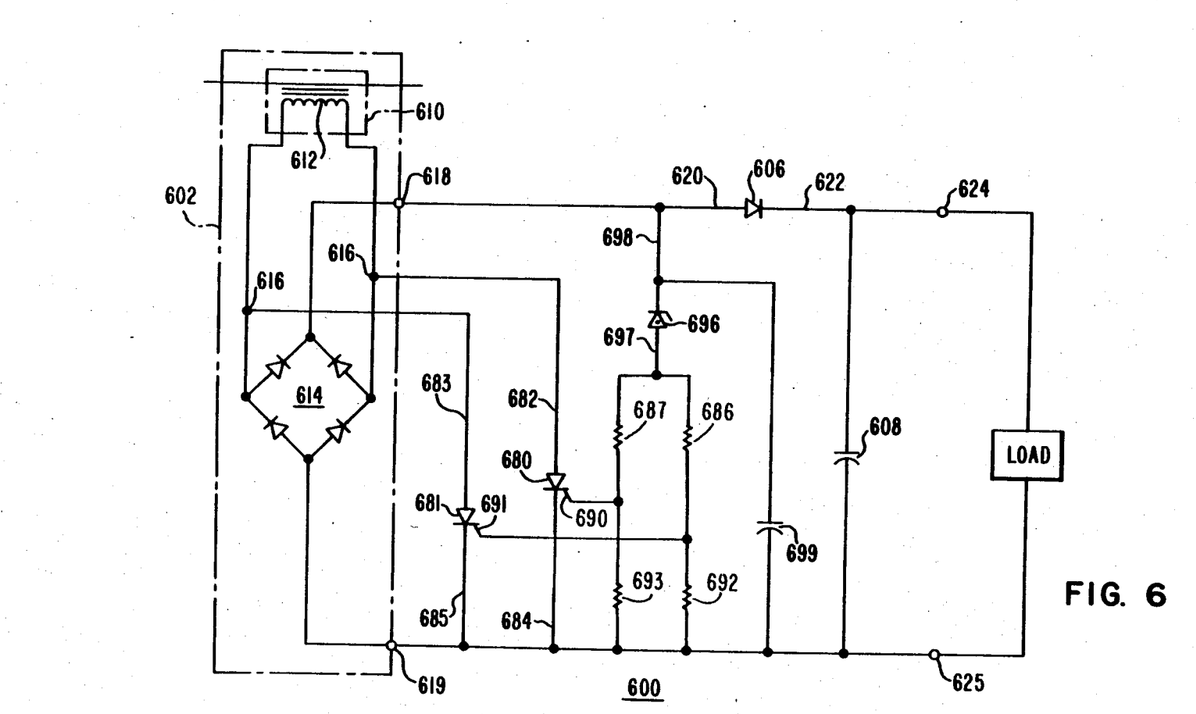
FIG. 6 is a schematic representation of a breakover diode thyristor shunting scheme used in combination with a current transformer.

A simplified breakover diode switching scheme is illustrated in FIG. 6. The power supply 600 is similar to that shown in FIG. 5. Components having the same or similar functions will be similarly numbered but starting in the 600 series. The power supply 600 is comprised of an ac-to-dc converter 602 including the current transformer 610, the rectifier 614 and the thyristors 680 and 681 and their associated current limiting resistors 686 and 687 and current bypass resistors 692 and 693 are substantially the same in both design and function as those shown in FIG. 5. A breakover diode 696 and associated capacitor 699 are used to regulated the output of the power supply 600. The anode 697 of the breakover diode 696 is connected to the current limiting resistors 686 and 687 while the cathode 698 thereof is connected to the plus terminal 618 of the rectifier 614. The capacitor 699 is also connected between the plus terminal 618 and common 619 of the power supply 600. An isolation diode 606, functioning substantially in the same manner as the isolation diode 306 of FIG. 5, and a voltage support capacitor 608 are also provided. The anode 620 of the isolation diode 606 is connected to the plus terminal 618 of the rectifier 614 with the cathode 622 thereof connected in series to the capacitor 608 which is then connected to the common 619. In this circuit the thyristors 680 and 681 and their respective current limiting resistors 686 and 687 are substantially identical to those shown in FIG. 5. Here however the rectifier bridge 614 is in a four diode configuration and the current transformer secondary winding 612 does not have a center tap. The anodes 682 and 683 of the thyristors are connected to the input terminals 616, 616 of the rectifier 614 with the cathodes 684 and 685 of the thyristors being connected to the common terminal 619 on the output of the bridge rectifier 614. When the breakover diode 696 conducts, the thyristors 680 and 681 will be triggered, shorting the ac input of the rectifier 614. At this point, the isolation diode 606 is reversed biased, preventing the discharge of the voltage support capacitor 608.

Where thyristors are used in the various power supply, a snubber circuit, consisting of a capacitor in series with a current limiting resistor, can be provided in parallel with each thyristor and is connected to the anode and cathode thereof. This snubber circuit is a conventional protective device for the thyristors.

Figure 7:
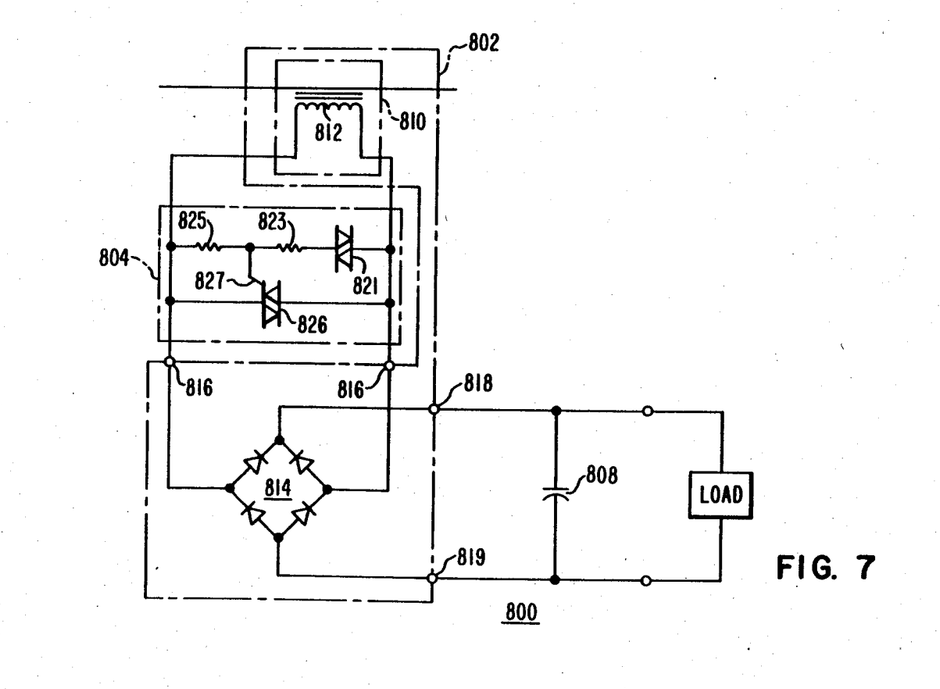
FIG. 7 is a schematic representation of a selflimiting power supply utilizing a diac/triac combination.

In FIG. 7, the power supply comprised of an ac-to-dc converter 802, an ac limit circuit 804, and a voltage support capacitor 808. The ac-to-dc converter 802 includes a current transformer 810 having the secondary winding 812 connected to a full-wave diode bridge rectifier 814 at its input terminals 816, 816. Connected to the plus 818 and common 819 output terminals of the bridge rectifier 814 is the voltage support capacitor 808. Voltage regulation is achieved using the limit circuit 804 constructed from a diac 821 that is connected in series with a resistor combination having two resistors 823 and 825 connected in series. The resulting diac/resistor combination is connected across the secondary winding 812 of the current transformer 810. A triac 826 having a gate input 827 is also connected across the secondary winding 812 of the current transformer 810. The gate input 827 of the triac 826 is connected between the resistors 823 and 825 of the resistor combination. In operation the diac 821 will conduct when the voltage applied thereto is equal to or greater than a predetermined breakover voltage. This produces a current pulse in the resistor combination. This current pulse, which will appear on the gate input 827 of the triac 826, triggers the triac 826 into conduction, shorting the secondary winding 812 of the current transformer 810. No additional isolation diodes are required as the diode bridge rectifier 814 itself will act to isolate the voltage support capacitor 808 from the short circuit created by the triac 826 during conduction. The breakover voltage of the diac 821 is substantially equal to the desired rectified dc output voltage of the power supply.

In addition to the above embodiments, a current transformer having multiple secondary windings can also be used in the power supply. This allows multiple power supplies to be available. With this arrangement only a single switching or limiting circuit is required in that a short circuit on the output of any one of the secondary windings will act as a short circuit for all of the windings. Other embodiments of the invention will be apparent to those skilled in the art from consideration of the specification or from practice of the invention disclosed herein. It is intended that the specification be considered as exemplary only with the scope and spirit of the present invention being indicated by the following claims.

We claim:

1. A locally isolated, regulated power supply providing a regulated dc power output from an ac system current source having a large dynamic range, comprising:

ac-to-dc converter means for providing a rectified dc output from an ac input comprising a current transformer in combination with a rectifier means;

the current transformer having a saturable magnetic stacked joint core for receiving a primary winding and a lumped secondary winding, the primary winding connected to the ac system current source with the secondary winding and magnetic core being inductively coupled thereto, the current transformer producing a reduced secondary ac output that is a nonlinear function of the ac system current characterized by the coupling between the core and the secondary winding decreasing in a nonlinear manner as the core approaches saturation thereby limiting the increase in the secondary ac output of the current transformer to a value substantially less than the increase in the ac system current when the core is in saturation;

the rectifier means connected to the secondary winding for converting the secondary ac output to the rectified dc output, the rectified dc output comprising a dc output voltage and a dc output current;

electronically controlled switch means having as inputs a predetermined reference voltage and the dc output voltage and connected across the converter means for the continual shunting of the converter means whenever the dc output voltage is equal to or greater than the predetermined reference voltage;

capacitive voltage support means connected to the output of the converter means for maintaining the dc output voltage substantially equal to the reference voltage; and isolation means for isolating the voltage support means voltage from the converter means when shunted by the switch means thereby preventing the discharge of the voltage support means.

2. The power supply of claim 1 wherein the isolation means comprises a diode connected between the voltage support means and the switch means with the diode being reversed biased by the voltage at the voltage support means when the converter means is shunted.

3. The power supply of claim 1 wherein the electronically controlled switch means comprises:

a comparator having hysteresis and having as inputs the reference signal and the dc output voltage and having as an output a switched control signal, the control signal occurring whenever the dc output voltage is equal to or greater than the reference signal with the amount of hysteresis effecting the frequency at which the control signal is switched and the degree of regulation of the rectified dc output; and a controllable, normally nonconducting semiconductor switch connected across the output of the rectifier means and responsive to the control signal of the comparator for shunting the converter means when actuated by the control signal.

4. A locally isolated, regulated power supply providing a regulated dc power output from an ac system current source having a large dynamic range, comprising:

ac-to-dc converter means for providing a rectified dc output from an ac input comprising a current transformer in combination with a rectifier means;

the current transformer having a saturable magnetic stack joint core for receiving a primary winding and a lumped secondary winding, the primary winding connected to the ac system current source with the secondary winding and magnetic core being inductively coupled thereo, the current transformer producing a reduced secondary ac output that is a nonlinear function of the ac system current characterized the coupling between the core and the secondary winding decreasing in a nonlinear manner as the core approaches saturation thereby limiting the increase in the secondary ac output of the current transformer to a value substantially less than the increase in the ac system current when the core is in saturation;

the rectifier means having an input connected to the secondary winding and an output, the rectifier means converting the secondary ac output of the current transformer to the rectified dc output available at the output thereof, the rectified dc power output comprising a rectified dc output voltage and a rectified dc output current;

means connected to the output of the rectified means for providing a level signal indicative of the magnitude of the rectified dc output voltage of the converter means;

electronically controlled switch means having as inputs a predetermined reference signal and the level signal and connected across the converter means for continually shunting the converter means whenever the level signal is equal to or greater than the predetermined reference signal thereby regulating the rectified dc output voltage substantially proportional to the reference voltage;

capacitive voltage support means in connection with the output of the rectifier means for maintaining the level of the rectified dc output voltage substantially proportional to the reference voltage when the converter means is shunted; and isolation means for isolating the voltage support means from the converter means when shunted by the switch means thereby substantially preventing the discharge of the voltage support means when the converter means is shunted by the switch means.

5. The power supply of claim 4 wherein the isolation means comprises a diode connected between the voltage support means and the switch means with the diode being reversed biased by the voltage at the voltage support means when the converter means is shunted.

6. The power supply of claim 4 wherein the electronically controlled switch means comprises:

a comparator having hysteresis and having as inputs the reference signal and the dc output voltage and having as an output a switched control signal, the control signal occurring whenever the dc output voltage is equal to or greater than the reference signal with the amount of hysteresis effecting the frequency at which the control signal is switched and the degree of regulation of the rectified dc output; and a controllable, normally nonconducting semiconductor switch connected across the output of the rectifier means and responsive to the control signal of the comparator for shunting the converter means when actuated by the control signal.

7. A locally isolated, regulated power supply providing a regulated dc power output from an ac system current source having a large dynamic range, comprising:

ac-to-dc converter means for providing a rectified dc output from an ac input comprising a current transformer in combination with a rectifier means;

the current transformer having a saturable magnetic stack joint core for receiving a primary winding and a lumped secondary winding having a center tap, the primary winding connected to the ac system current source with the secondary winding and magnetic core being inductively coupled thereto, the current transformer producing a reduced secondary ac output that is a nonlinear function of the ac system current characterized the coupling between the core and the secondary winding decreasing in a nonlinear manner as the core approaches saturation thereby limiting the increase in the secondary ac output of the current transformer to a value substantially less than the increase in the ac system current when the core is in saturation;

the rectifier means having an input connected across the secondary winding and an output, the rectifier means converting the secondary ac output of the current transformer to the rectified dc output available at the output thereof, the rectified dc power output comprising a rectified dc output voltage and a rectified dc output current;

means connected to the output of the rectifier means for providing a level signal indicative of the magnitude of the rectified dc output voltage of the converter means;

a comparator having hysteresis and having as inputs a predetermined reference signal and the level signal and having as an output a switched control signal, the control signal occurring whenever the level signal is equal to or greater than the reference signal with the amount of hysteresis effecting the frequency at which the control signal is switched and the degree of regulation of the rectified dc power output;

a controllable, normally nonconducting semiconductor switch responsive to the control signal of the comparator;

a thyristor pair means including means for limiting current into the gates thereof when fired and means for bypassing leakage current therefrom when off, the thyristors being connected in series and having a common cathode, the thyristor pair connected across the secondary winding with the common cathode connected to the center tap of the secondary winding, the gates of each thyristor being responsive to the semiconductor switch whereby conduction of the semiconductor switch caused by the control signal produces a current signal on each gate for firing the thyristors for shunting the secondary winding and reverse biasing the rectifier means; and capacitive voltage support means in connection with the output of the rectifier means for maintaining the level of the rectified dc output voltage substantially proportional to the reference voltage with the reversed biased rectifier means preventing the discharge voltage support means when the secondary winding is shunted.

8. A locally isolated, regulated power supply providing a regulated dc power output from an ac system current source having a large dynamic range, comprising:

ac-to-dc converter means for providing a rectified dc output from an ac input comprising a current transformer in combination with a rectifier means;

the current transformer having a saturable magnetic stack joint core for receiving a primary winding and a lumped secondary winding having a center tap, the primary winding connected to the ac system current source with the secondary winding and magnetic core being inductively coupled thereto, the current transformer producing a reduced secondary ac output that is a nonlinear function of the ac system current characterized the coupling between the core and the secondary winding decreasing in a nonlinear manner as the core approaches saturation thereby limiting the increase in the secondary ac output of the current transformer to a value substantially less than the increase in the ac system current when the core is in saturation;

the rectifier means having an input connected across the secondary winding and an output, the rectifier means converting the secondary ac output of the current transformer to the rectified dc output available at the output thereof, the rectified dc power output comprising a rectified dc output voltage and a rectified dc output current;

a breakover diode connected to the output of the rectifier means and having a predetermined breakover voltage at which current conduction through the breakover diode occurs;

a capacitor connected in parallel with the output of the rectifier means;

a thyristor pair means including means for limiting current into the gates thereof when fired and means for bypassing leakage current therefrom when off, the thyristors being connected in series and having a common cathode, the thyristor pair connected across the secondary winding with the common cathode connected to the center tap of the secondary winding, the gates of each thyristor being in responsive to the breakover diode whereby conduction of the breakover diode caused when the dc output voltage applied thereto is equal to or greater than the breakover voltage discharges the capacitor therethrough producing a current pulse on each gate of the thyristors for firing the pair of thyristors thereby shunting the secondary winding; and capacitive voltage support means in connection with the output of the rectifier means for maintaining the level of the dc output voltage substantially proportional to the breakover voltage; and isolation means for isolating the voltage support means from the converter means when shunted by the thyristors thereby preventing the discharge of the voltage support means.

9. The power supply of claim 8 wherein the isolation means comprises a diode connected between the voltage support means and the capacitor with the diode being reversed biased by the voltage at the voltage support means when the converter means is shunted.

10. A locally isolated, regulated power supply providing a regulated dc power output from an ac system current source having a large dynamic range, comprising:

ac-to-dc converter means for providing a rectified dc output from an ac input comprising a current transformer in combination with a rectifier means;

the current transformer having a saturable magnetic stacked joint core for receiving a primary winding and a lumped secondary winding having a center-tap, the primary winding connected to the ac system current source with the secondary winding and magnetic core being inductively coupled thereto, the current transformer producing a reduced secondary ac output that is a nonlinear function of the ac system current characterized the coupling between the core and the secondary winding decreasing in a nonlinear manner as the core approaches saturation thereby limiting the increase in the secondary ac output of the current transformer to a value substantially less than the increase in the ac system current when the core is in saturation;

the rectifier means having an input connected across the secondary winding and an output including a common, the rectifier means converting the secondary ac power output of the current transformer to the rectified dc power output available at the output thereof, the rectified dc power output comprising a dc output voltage and a dc output current;

a breakover diode having a predetermined breakover voltage at which current conduction through the breakover diode occurs;

a capacitor connected across the output of the rectifier means;

a thyristor pair means including means for limiting current into the gates thereof when fired and means for bypassing leakage current therefrom when off, the thyristors being connected in series and having a common cathode, the thyristor pair connected across the secondary winding with the common cathode connected to the center tap of the secondary winding, the gates of each thyristor being in responsive to the breakover diode whereby conduction of the breakover diode caused when the dc output voltage applied thereto is equal to or greater than the breakover voltage discharges the capacitor therethrough producing a current pulse on each gate of the thyristors for firing the pair of thyristors thereby shunting the secondary winding;

capacitive voltage support means in connection with the output of the rectifier means for maintaining the level of the rectified dc output voltage substantially proportional to the breakover voltage; and an isolation diode connected between the voltage support means and the capacitor, the isolation diode being connected so as to be reversed biased by the voltage of the voltage support means when the breakover diode is in conduction thereby preventing the discharge of the voltage support means through the breakover diode.

11. A locally isolated, regulated power supply providing a regulated dc power output from an ac system current source having a large dynamic range, comprising:

ac-to-dc converter means for providing a rectified dc output from an ac input comprising a current transformer in combination with a rectifier means;

the current transformer having a saturable magnetic stacked joint core for receiving a primary winding and a lumped secondary winding, the primary winding connected to the ac system current source with the secondary winding and magnetic core being inductively coupled thereto, the current transformer producing a reduced secondary ac output that is a nonlinear function of the ac system current characterized the coupling between the core and the secondary winding decreasing in a nonlinear manner as the core approaches saturation thereby limiting the increase in the secondary ac output of the current transformer to a value substantially less than the increase in the ac system current when the core is in saturation;

the rectifier means having an input connected across the secondary winding and an output, the rectifier means converting the secondary ac output of the current transformer to the rectified dc output available at the output thereof, the rectified dc output comprising a dc output voltage and a dc output current;

a switch circuit connected across the secondary winding of the current transformer comprising:

a resistor combination having a first resistor connected in series with a second resistor;

a diac connected in series with the resistor combination with the resulting combination connected across the secondary winding; the diac in conduction when the voltage applied thereto is equal to or greater than a first predetermined breakover voltage and producing a current pulse in the first and second resistors, the breakover voltage of the diac being representative of the desired dc output voltage of the power supply; and a triac having a gate input and connected across the secondary winding with the gate input connected between the first resistor and the second resistor, the triac being triggered into conduction on the occurrence of the current pulse received by the triac at the gate input thereof for shunting the secondary winding; and capacitive voltage support means connected across the rectified dc power output of the converter means for maintaining the magnitude of the rectified dc output voltage of the power supply at an essentially constant average value with the rectifier means value being reversed biased by the voltage on the voltage support means when the secondary winding is shunted thereby preventing the discharge of the voltage support means.

12. A locally isolated, regulated power supply providing a plurality of regulated dc power outputs from an ac system current source having a large dynamic range comprising:

ac-to-dc converter means for providing a rectified dc output from an ac input comprising a current transformer in combination with a rectifier means;

the current transformer having a saturable magnetic stacked joint core for receiving primary and a plurality of lumped secondary windings, the primary winding connected to the ac system current source with the secondary windings and magnetic core being inductively coupled thereto, the current transformer producing a plurality of reduced secondary ac outputs, each secondary ac output being a nonlinear function of the ac system current characterized the coupling between the core and each secondary winding decreasing in a nonlinear manner as the core approaches saturation thereby limiting the increase in each of the secondary ac outputs of the current transformer to a value substantially less than the increase in the ac system current when the core is in saturation;

the rectifier means connected to each of the secondary windings for converting the secondary ac outputs to the rectified dc outputs, each rectified dc output comprising a dc output voltage and a dc output current;

electronically controlled switch means having as inputs a predetermined reference voltage and the at least one of dc output voltags and connected across the converter means for the continual shunting of the converter means whenever the dc output voltage at the input thereof is equal to or greater than the predetermined reference voltage;

capacitive voltage support means connected to the output of each of the rectifier means for maintaining the dc output voltages substantially equal to the reference voltage; and isolation means for isolating each of the voltage support means from the converter means when shunted by the switch means thereby preventing the discharge of the voltage support means.

13. The power supply of claim 12 wherein each isolation means comprises a diode connected between the voltage support means and the converter with the diode being reversed biased by the voltage at the voltage support means when the converter means is shunted.

14. The power supply of claim 12 wherein the electronically controlled switch means comprises:

a comparator having hysteresis and having as inputs the reference signal and the dc output voltage and having as an output a switched control signal, the control signal occurring whenever the dc output voltage is equal to or greater than the reference signal with the amount of hysteresis effecting the frequency at which the control signal is switched and the degree of regulation of the rectified dc output; and a controllable, normally nonconducting semiconductor switch connected across the output of the rectifier means and responsive to the control signal of the comparator for shunting the converter means when actuated by the control signal.

* * * * *